United States Patent
Burago et al.

(10) Patent No.: US 7,492,366 B2
(45) Date of Patent: Feb. 17, 2009

(54) METHOD AND SYSTEM OF CHARACTER PLACEMENT IN OPENTYPE FONTS

(75) Inventors: Andrei Burago, Kirkland, WA (US); Jennifer P. Michelstein, Kirkland, WA (US); Sergey Genkin, Kirkland, WA (US); Victor E. Kozyrev, Issaquahj, WA (US); Sergey Malkin, Redmond, WA (US)

(73) Assignee: Microsoft Corporation, Redmond, OR (US)

( * ) Notice: Subject to any disclaimer, the term of this patent is extended or adjusted under 35 U.S.C. 154(b) by 634 days.

(21) Appl. No.: 11/129,149

(22) Filed: May 13, 2005

(65) Prior Publication Data

US 2006/0256116 A1 Nov. 16, 2006

(51) Int. Cl.
- *G06T 11/00* (2006.01)
- *G09G 5/24* (2006.01)
- *G09G 5/26* (2006.01)
- *G06F 17/20* (2006.01)
- *G06F 17/21* (2006.01)
- *G06F 17/22* (2006.01)
- *G06F 17/24* (2006.01)
- *G06F 17/25* (2006.01)

(52) U.S. Cl. ............... 345/469.1; 345/467; 345/468; 345/469; 345/471; 345/472.3; 715/255; 715/256; 715/262; 715/263; 715/267; 715/269

(58) Field of Classification Search ............... 715/255, 715/256, 262, 263, 267, 269; 345/467, 468, 345/469, 471, 469.1, 472.3
See application file for complete search history.

(56) References Cited

U.S. PATENT DOCUMENTS

| | | | | | |
|---|---|---|---|---|---|
| 3,946,365 A | * | 3/1976 | Bantner | ............... | 345/14 |
| 3,976,990 A | * | 8/1976 | Haak | ............... | 345/13 |
| 5,321,773 A | * | 6/1994 | Kopec et al. | ............... | 382/209 |

(Continued)

OTHER PUBLICATIONS

"Internationalized Text Manipulation Covering Perso-Arabic Enhanced for Mongolian Scrips," by Kataoka, T.I.; Kataoka, Y.; Uezono, K.; Ohara, H.; Electronic Publishing, Artistic Imaging, and Digital Typography, 7th Int'l Conference on Electronic Publishing, EP'98, held jointly with the 4th Int'l Conference on Raster Imaging and Digital Typography, RIDT'98 Proceedings, p. 305-18.

(Continued)

*Primary Examiner*—Ulka Chauhan
*Assistant Examiner*—Jeffrey J Chow
(74) *Attorney, Agent, or Firm*—Merchant & Gould P.C.

(57) ABSTRACT

A method and system for optimizing the horizontal spacing of superscripts and subscripts in open type font designs is disclosed. The system includes a module for vertically aligning and spacing characters and a module for horizontally aligning characters having differing baselines in accordance with cut-in information stored in font tables corresponding to each individual character in the font. This additional horizontal spacing adjustment capability provides for optimum placement of character glyphs having differing baselines, e.g., superscript or subscript. The method includes placing a first/next character on a baseline, retrieving a next adjacent character, determining whether a cut-in associated with one or both of the characters can be applied between the two characters, and then applying the appropriate cut-in. Ascertaining whether a cut-in may apply may be accomplished by evaluating relative positions of adjacent glyph bounding boxes.

14 Claims, 10 Drawing Sheets

U.S. PATENT DOCUMENTS

| | | | | |
|---|---|---|---|---|
| 5,432,890 | A * | 7/1995 | Watanabe | 715/210 |
| 5,609,427 | A * | 3/1997 | Takasawa et al. | 400/304 |
| 5,802,532 | A * | 9/1998 | Nakayama et al. | 400/304 |
| 5,803,629 | A * | 9/1998 | Neville et al. | 400/304 |
| 5,825,999 | A * | 10/1998 | Uzaki et al. | 345/467 |
| 6,426,751 | B1 * | 7/2002 | Patel et al. | 345/468 |
| 6,687,404 | B1 * | 2/2004 | Hull et al. | 382/226 |

OTHER PUBLICATIONS

"Statistical-Based Approach to Word Segmentation," by Yalin Wang; Phillips, I.T.; Haralick, R.; Proceedings 15th Int'l Conference on Pattern Recognition, ICPR-2000, Part vol. 4, p. 555-8 vol. 4.

"Word Level Script Identification for Scanned Document Images," by Huanfeng Ma; David Doermann; Document Recognition and Retrieval XI, San Jose CA, Jan. 21-22, 2004; SPIE proceedings series, 2004, 5296, p. 124-35.

"FreeType Glyph Conventions," Version 2.1, 1.Basic typographic concepts, by David Turner; http://freetypersouceforge.net/freetype2/docs/glyphs/glyphs-1.html, 2 pgs.

"FreeType Glyph Conventions," Version 2.1, III. Glyph metrics, by David Turner; http://freetype.sourceforge.net/freetype2/docs/glyphs/glyphs-3.html, 6 pgs.

"FreeType Glyph Conventions," Version 2.1, IV. Kerning, by David Turner; http://freetype.sourceforge.net/freetype2/docs/glyphs.glyphs-4.html, 3 pgs.

"FreeType Glyph Conventions," Version 2.1, V. Text processing, by David Turner; http://freetype.sourceforge.net/freetype2/docs/glyphs/glyphs-5.html, 5 pgs.

"FreeType Glyph Conventions," Version 2.1, VII. FreeType bitmaps, by David Turner; http://freetype.sourceforge.net/freetype2/docs.glyphs/glyphs-7.html, 5 pgs.

"TeX," http://en.wikipedia.org/wikiTeX; 7 pgs.

"The Anatomy of a Large-Scale Hypertextual Web Search Engine," by Sergey Brin and Lawrence Page; http://net.pku.edu.cn/~webg/html/com1921.htm, p. 1-20.

"Part Five Working With Fonts," Topics in IRIX Programming, http://ondine.cict.fr:8010/ebt-bin/nph-dweb/dynaweb/SGI_Developer/T_ITIX_Prog/@Gen...; p. 1-16.

"Typeface," http://en.wikipedia.org/wiki/Typeface, p. 1-8.

International Search Report for PCT/US06/12644 Mar. 03, 2008.

* cited by examiner

METHOD AND SYSTEM OF CHARACTER PLACEMENT IN OPENTYPE FONTS

TECHNICAL FIELD

The present invention generally relates to digital typography. More particularly, the invention is directed to a placement of glyphs or glyph information in particular fonts.

BACKGROUND OF THE INVENTION

Typography is the art and technique of working with type. Digital typography refers to manipulation and display of digital images produced on digital composition systems such as in word processors, spreadsheets, desktop publishing, web browsers, and other computer applications for rendering on displays and digital printers, etc. Digital typography is based on a hierarchy of objects called characters, fonts, and font families or typefaces. Numeric values or measurements related to those objects can be divided into character metrics, font metrics, and typeface metrics. Often all information about a font family, or typeface, is stored in a set of font files or in a font table.

The following definitions are used throughout this specification and should be helpful in understanding the invention described herein.

A glyph is a two dimensional graphical bitmap or image of a character, where a character is a textual unit of type. Letters, digits, punctuation marks, and mathematical symbols are examples of characters. Glyphs comprise the actual graphical information associated with displaying the character on the user interface.

A font is a set of glyphs having common features, e.g., the same typeface, same style and same weight. For example, a font may consist of characters that include the letters Aa-Zz and numbers 0-9 all in one typeface, such as Arial.

In font design, there is a concept called the bounding box. This bounding box or "bbox" is the imaginary, bounding, two-dimensional box within which displayable glyph information (or a displayable character for a particular glyph) in a font will fit. Given that the size of the displayable character for a particular glyph may be different than another, the bboxes may have different dimensions from one another. Given this character dependence, the bboxes are sometimes referred to as character bboxes.

Typographers use small units of measure called "points" to specify font size. A point is approximately equal to 1/72 of an inch, and, utilizing this unit of measure helps make the size of the font somewhat independent from the particular limitations of the display device.

A straight layout of characters simply uses the bbox, plus a uniform space between adjacent letters (or some other "advance width" associated with each glyph). For example, in Courier font, some of the letters may appear further apart than is pleasing to the reader's eye. This is typically the result achieved on an old, manual typewriter and mono-spaced type fonts. These mono-spaced fonts are generally less pleasing to the eye since many displayed characters appear too far apart.

A method of adjusting the spacing between letters is often utilized in more advanced fonts and is typically referred to as proportional spacing. The term "kerning" refers to specific information to adjust the relative horizontal positions of some coincident glyphs in a string of text. Kerning consists of modifying the spacing between two successive glyphs according to their outlines to make the combination of the two glyphs more pleasing to the eye. For example, "A" and "V", if adjacent, may have a reduced space between them than other coincident glyphs such as "A" and "A". The kerning distance values are typically ordered pairs, and can be expressed in horizontal or vertical directions, depending on layout and/or script. The kerning distance values are typically stored in a font "table" as attributes of a particular character for a particular font, as part of the glyph for that character. Consequently kerning helps solve the spacing problem with respect to two coincident glyphs placed side by side.

That said however, a similar spacing problem arises with respect to the use subscript text and/or superscript text in combination with a base character, especially when the superscript or subscript text comprises a plurality of characters that modify the base character. Often the resulting combination of the base character and the subscript or superscript character(s) appears oddly because the two are not sufficiently close together, e.g., as if the superscript or subscript does not modify the base character because the placement is too far apart.

It is with respect to these and other considerations that the present invention has been made.

SUMMARY OF THE INVENTION

In accordance with the present invention, the above and other problems are solved by a system for horizontal adjustment of superscript and/or subscript characters to move the displayed characters closer together. In accordance with aspects of the present invention, a base glyph in a font has a set of cut-in values associated with it stored in a font table. The cut-in values for the glyph are evaluated during placement of the superscript and subscript glyphs so that improved placement of the superscript and subscript displayed characters are achieved.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Embodiments of the present invention provide a method and tool for a font designer to horizontally adjust the positioning of adjacent glyphs in superscript and subscript relationships to optimize their composite positions.

Figure 1:
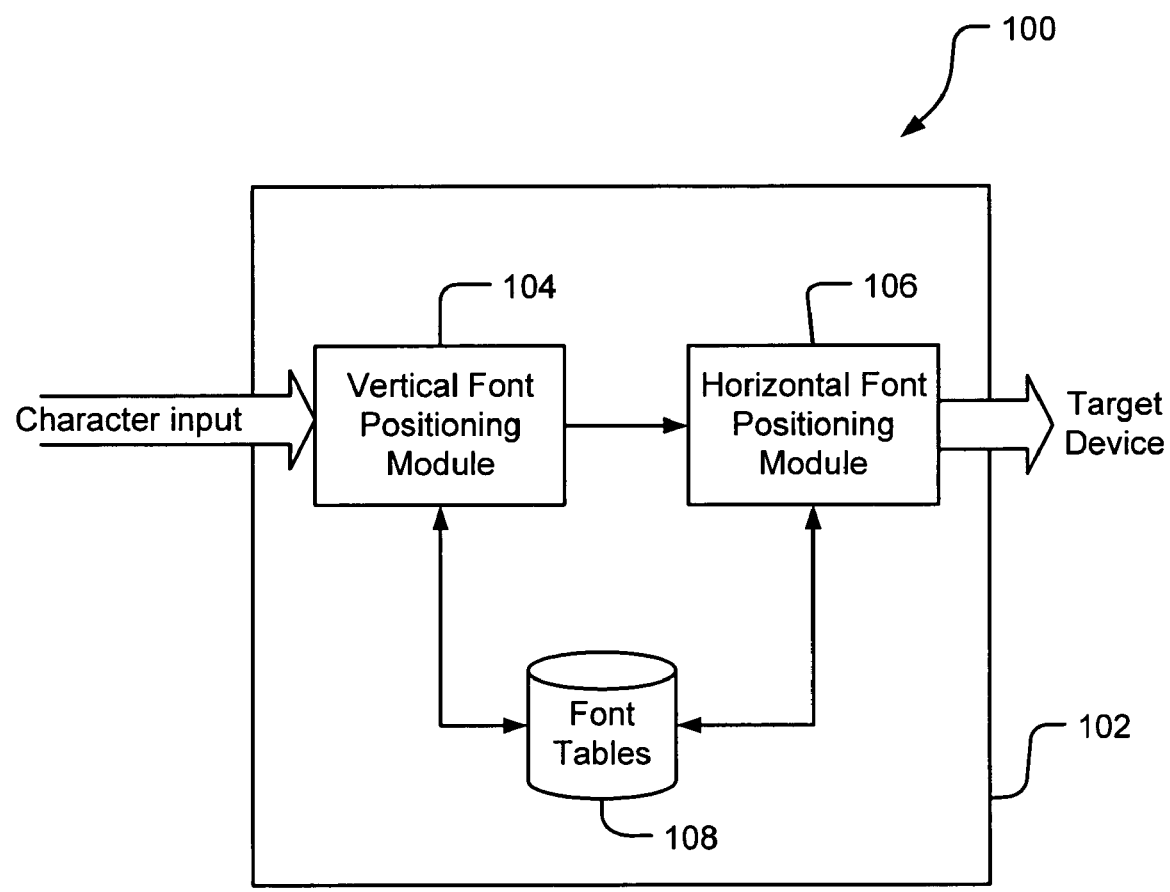
FIG. 1 illustrates a font processing system that stores font and glyph information according to an embodiment of the present invention.

A font processing system 100 in accordance with an embodiment of the present invention is shown in FIG. 1. This font processing system 100 receives glyph requirement information or strings from a word processing, spreadsheet, desktop publish, web browser, or other application in a positioning module 102 and determines proper vertical positioning of the glyphs and glyph strings in a conventional vertical positioning module 104, and then processes the glyphs and glyph strings through a horizontal positioning module 106. Both the vertical positioning module 104 and the horizontal positioning module draw information from font table 108, and then provide output to a target device (not shown) such as a printer buffer or display buffer for rendering such as on a printed page or on a display.

The font table 108 stores glyph information, i.e., tabular information indicating how particular glyph displayable information will be displayed upon rendering. The glyph information may include, for example, the size of the rectangular bounding box (bbox), the typeface for the character, kerning values for use in combination with other coincident glyphs, etc. Furthermore, in accordance with aspects of the present invention, the font table 108 will also include "cut-in" values for one or more glyphs. The cut-in values relate to or define portions of a particular glyph's bbox that may be used to actually display a portion of a coincident glyph, i.e., coincident glyph information. Thus, these cut-in values, as will be discussed in more detail below, allow the horizontal positioning device to place subsequent glyphs, such as subscript and/or superscript glyphs closer to a base glyph.

Figure 2:
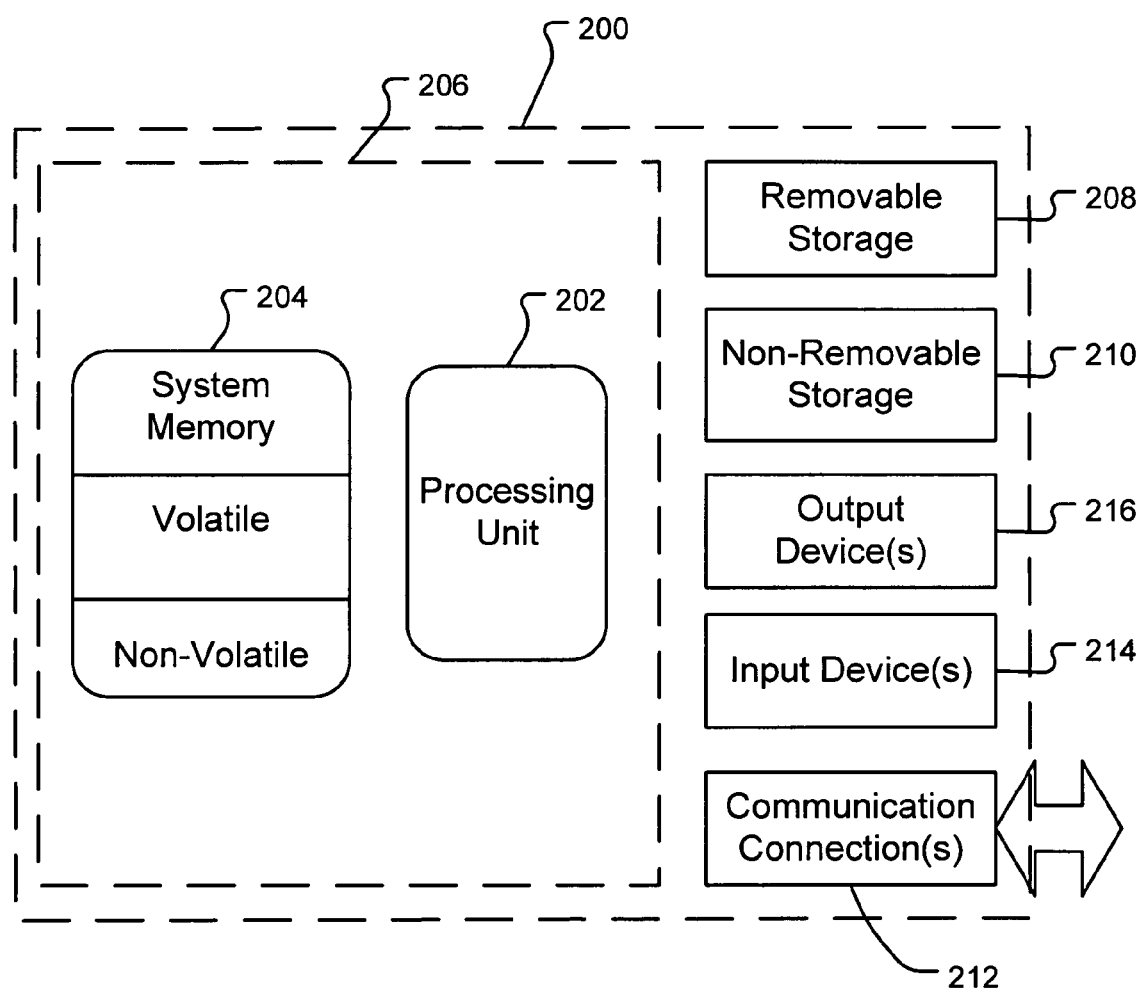
FIG. 2 shows a computer system environment that may incorporate software operating according to particular aspects of the present invention.

Given that the present invention may be implemented as a computer system, FIG. 2 is provided to illustrate an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. An exemplary basic configuration of such a computing device is illustrated in FIG. 2 by dashed line 206.

In addition to the memory 204, the system may include at least one other form of computer-readable media. Computer-readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208, and non-removable storage 210 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, devices such as displays, speakers, and printers. For the purposes of this invention, the display is a primary output device. Each of these devices is well know in the art and, therefore, not described in detail herein.

With the computing environment in mind, embodiments of the present invention are described with reference to logical operations being performed to implement processes embodying various embodiments of the present invention. These logical operations are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. For instance, positioning module 102 (and its sub-modules) generally relate to the positioning operations and functions programmed into a computer implemented system of presenting information for print or display. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
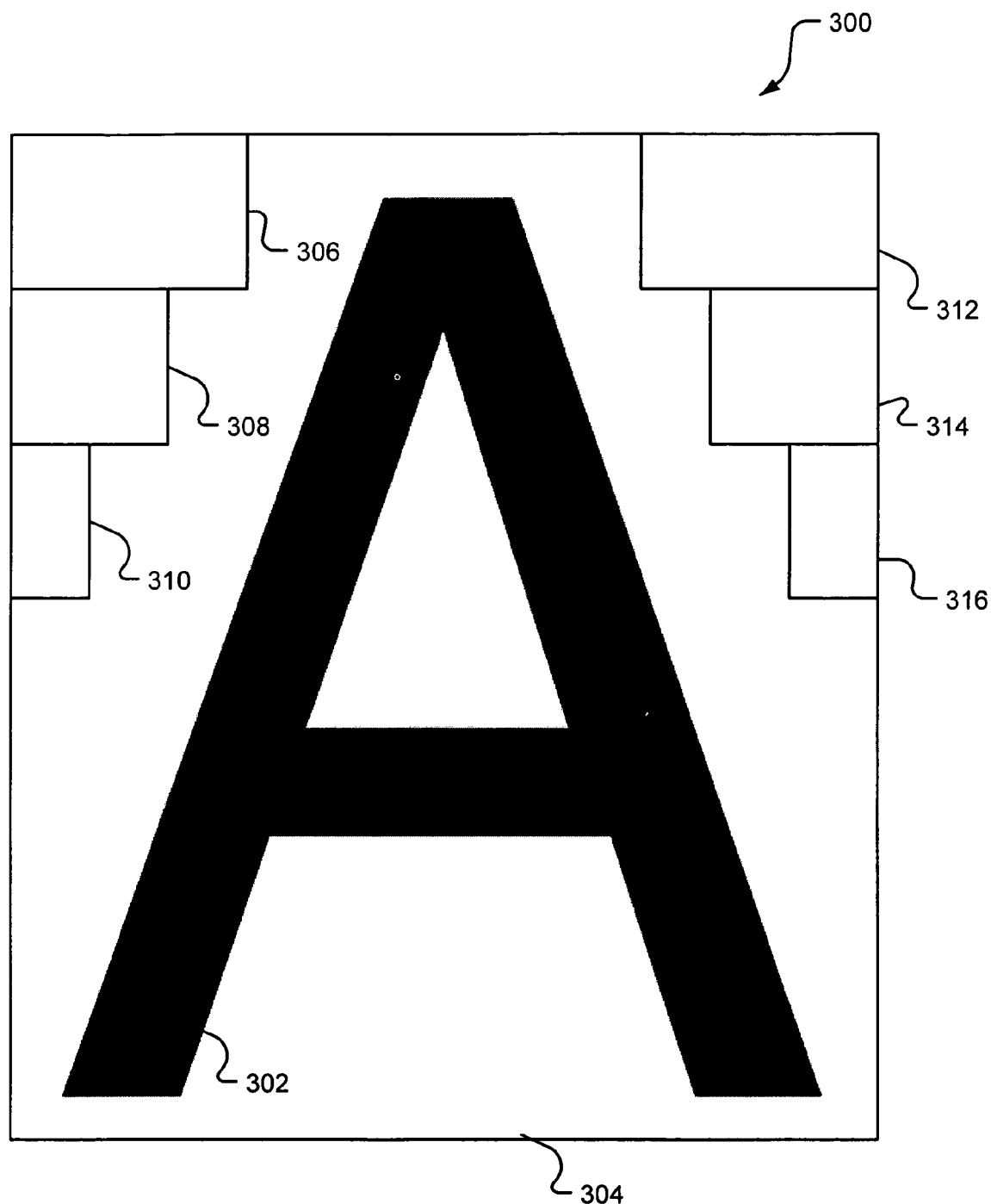
FIG. 3 illustrates a character bounding box for an exemplary character "A" according to the embodiment of the present invention as in FIG. 1.

FIG. 3 illustrates an example character display in accordance with aspects of the present invention. As stated above, glyphs in digital typesetting have an imaginary bounding box or "bbox" within which a glyph's displayable information fits. Representation 300 of a displayed character 302 is defined in accordance with an embodiment of the present. In FIG. 3, character 302 is an exemplary font letter "A". Also shown surrounding the character 302 is its bbox 304. The bbox 304 may not be the same height and width for all characters of the same point size in the selected font. The bbox 304 dimensions are stored in a font table, such as font table 108 (FIG. 1). As should be appreciated, the bbox 304 is shown in FIG. 3 to illustrate principles of the present invention, but such a bbox would not be displayed when the character 302 is rendered on a display or printed.

In accordance with embodiments of the present invention, the character 302 has one or more cut-in values associated with its glyph, depending on the shape of the displayable character within the glyph. In the example shown in FIG. 3, there are two sets of cut-in values, one set for each upper corner of the bbox 304. That is, FIG. 3 shows an exemplary embodiment, where, for the character "A" the lower left and right corners have no cut-in values since the "A" has printable matter generally reaching these corners. However, the glyph has cut-ins values represented by boxes 306, 308, and 310 in the upper left hand corner (as shown) of the bbox 304 and boxes 312, 314 and 316 in the upper right hand corner (as shown) of bbox 304. These are permissible horizontal "spacings" that may be utilized when the character 302 is positioned either as a subsequent subscript character (e.g., the use of boxes 306, 308 and 310) or when a different, subsequent character is placed in superscript form to the character 302 (e.g., the boxes 312, 314 and 316). By using these cut-in values or more accurately, the space identified by these cut-in values, the character 302 may be placed closer to a base character, or it may have subsequent subscript characters placed closer to it.

In the embodiment shown in FIG. 3, three different cut-in values per upper corner are provided. The number of cut-ins per set depends on the particular glyph and depends on the desires of the font designer for improved spacing. However, fonts could accommodate almost any number of cut-ins per set. The use of more than one cut-in value in a particular corner is described in more detail below with respect to FIG. 6. As may be appreciated, the widths of the cut-ins are generally predetermined by a font designer and thus are typically different from font to font. Moreover, in an embodiment each cut-in in a particular corner (when there is more than one cut-in) has a different width, where the upper cut-ins for upper corners are wider than those below. Similarly, with respect to cut-ins for lower corners, the lower cut-ins are wider than those above. Also, in an embodiment, each subsequent cut-in, moving from the outside in, necessarily includes the previous cut-in value. For instance, cut-in 308 includes cut-in 306. Similarly cut-in 310 includes cut-in 308, which, in turn, includes cut-in 306. Alternative embodiments may not provide for such inclusion however.

Figure 4:
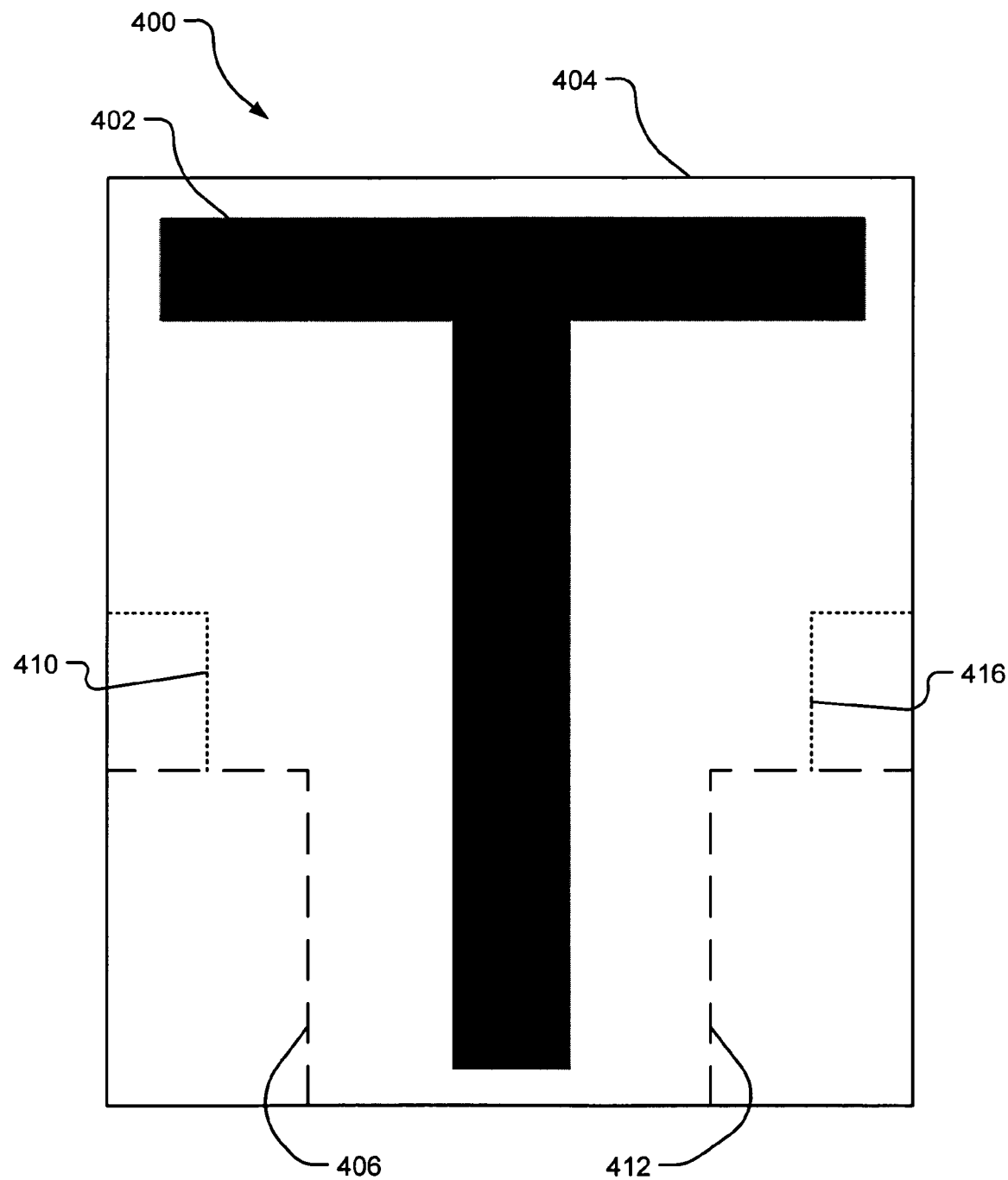
FIG. 4 illustrates a character bounding box for an exemplary character "T" according to an embodiment of the invention.

Turning now to FIG. 4, another representation 400 of a displayed character 402 in the same font as in FIG. 3 is shown. As shown, the character 402 has a bounding box 404. However, for this character 402, a letter "T", the upper left and right cut-in sets are empty (i.e., there are no cut-in values for the upper corners) but the lower left and right corners have cut-in values given the relative empty space in these corners. Lower left cut-in dimensions 406 and 410 are stored with the character 402 in the font table for the letter character "T". Lower right cut-in dimensions 412 and 416 are also stored with the character 402 in the font table for the letter character "T".

Figure 5:
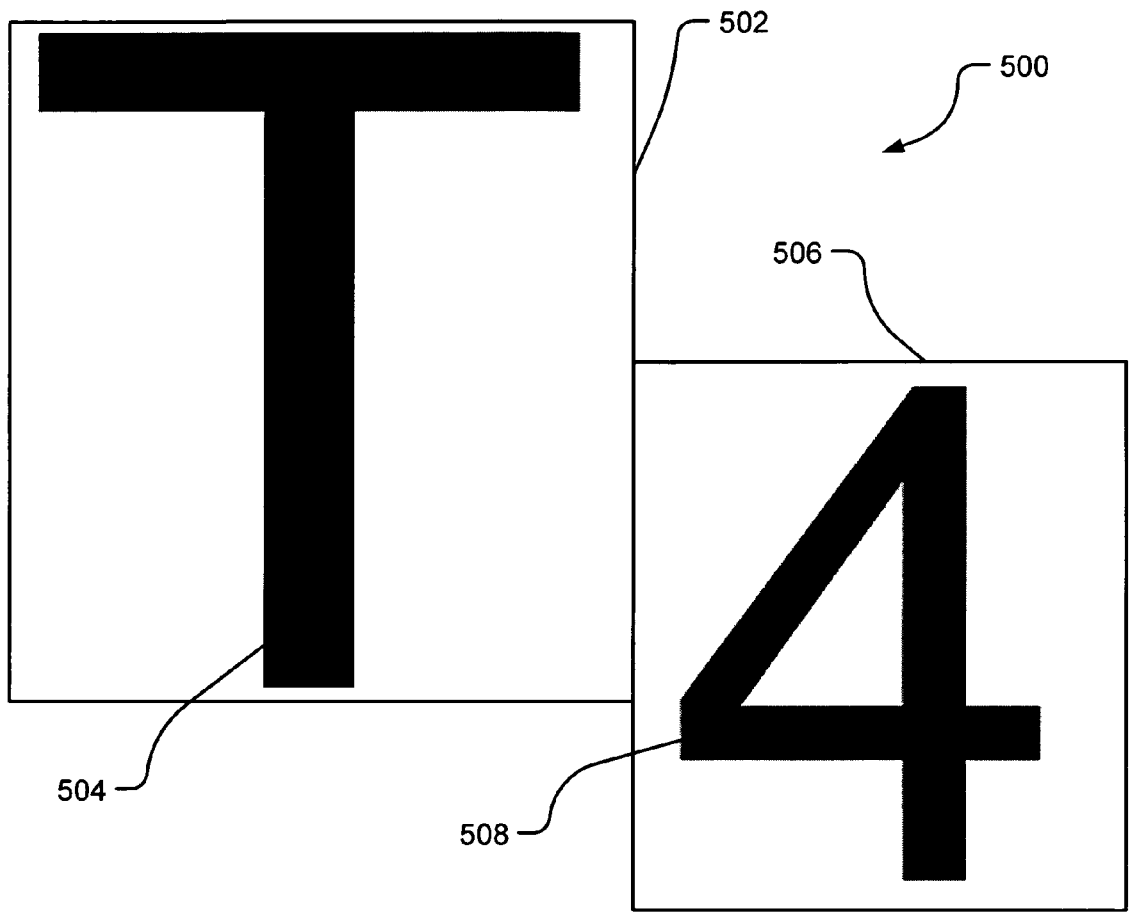
FIG. 5 is a composite of two glyphs prior to horizontal adjustment.

The representation shown in FIG. 4 illustrates another concept of the present invention. That is, cut-in 412 for example, is shown with a long-dashed line and illustrates the space used by or provided by the cut-in 412. In one embodiment, this is the cut-in value that is used to place a subsequent character closer to the character 402. In another embodiment, the cut-in value represented by 416, displayed with a short-dashed line, is used to place a subsequent character closer to the character 402. Of course, there may some instances where the subsequent character gets no closer to the character 402 than the original boundary of the bbox 404. FIGS. 5, 6 and 7 illustrate how these decisions are made.

Initially, referring to FIG. 5, a composite glyph set 500 is shown. Here the base displayable character 504, a letter "T", is shown adjacent a subscript displayable character 508, a number "4" before adjustment in accordance with embodiments of the present invention. Character 504 has a bounding box 502. Character 508 has a bounding box 506. Note that the character 508 is on a different, subscript baseline (not shown) lower than that of the base character 504. The top of the bounding box 506 is approximately half way between the bottom and top of the bounding box 502. In essence, in an embodiment, the first step of the process of improving the placement of a subsequent character involves placing the subsequent character (in this case character 508) in its vertical location. The placement of the subsequent character 508 provides the system, e.g., system 100 (FIG. 1) the relative position of the bbox 506 in relationship to the bbox 502 of the base character. Using the relative position information, necessary determinations can be made with respect to cut-in usage, as described below.

Figure 6A:
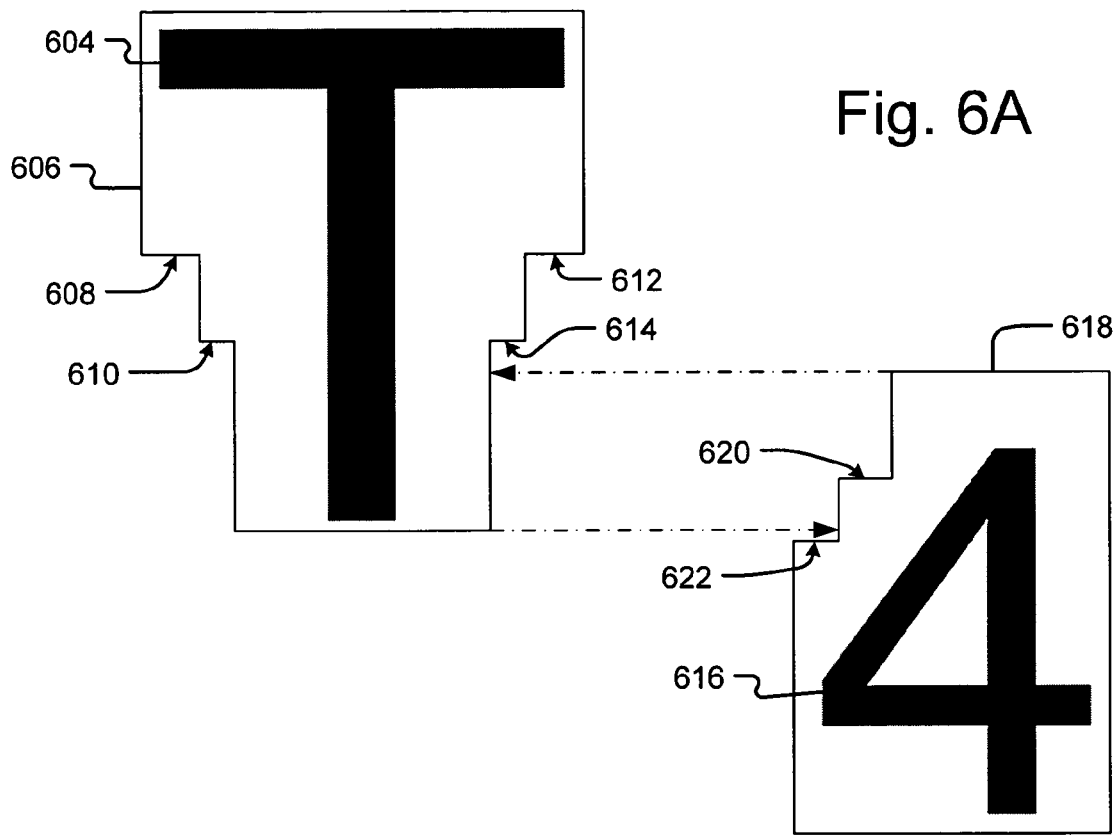
FIGS. 6A and 6B illustrate the process of determining which cut-in values to choose in horizontally placing or adjusting adjacent glyphs in accordance with an embodiment of the present invention.
Figure 6B:
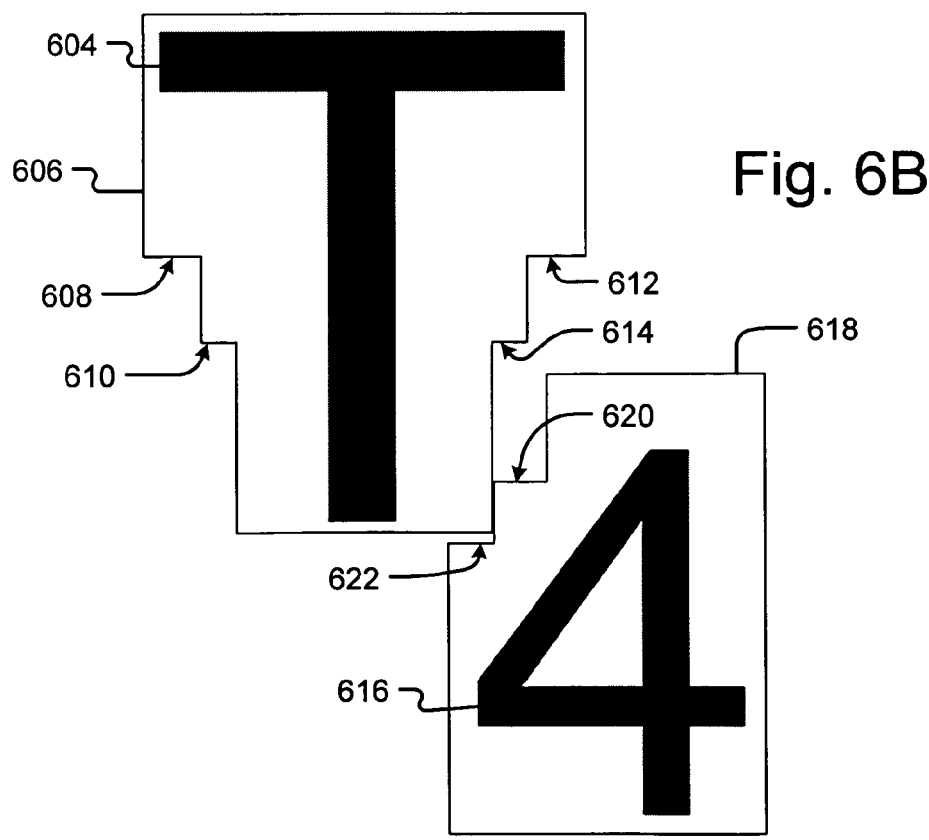

FIGS. 6A and 6B illustrate the process of determining which cut-in values to choose in horizontally placing or adjusting an adjacent glyph in accordance with an embodiment of the present invention. The character 604 bounding box 606 includes lower left cut-ins 608 and 610. Similarly, the character 604 has lower right cut-in values 612 and 614.

In this example shown in FIGS. 6A and 6B, character 616 is the subsequent or adjacent character that will be adjusted horizontally to modify the base character 604. Character 616 has a bounding box 618 and also has cut-in 620 and 622. For the purposes of this example however, the cut-ins 620 and 622 are not relevant to the selection process.

In order to determine which cut-in value 612 or 614 to choose for horizontal adjustment, a comparison of relative positions of the bboxes 606 and 618 is performed. That is, once the bbox 618 is placed vertically, the top of the bbox 618 is located. Next, this location value is compared to the various cut-in values 612 and 614. The cut-in for the bottom-right corner that is associated with the lowest height that is higher than the top of the bbox 618 is chosen and applied. As shown, the cut-in 614 is the lowest cut-in value that is still higher than the relative position of the top of 618. Consequently, cut-in 614 is chosen and applied. Of course, had there only been one cut-in value for the base character, then the process would simply determine if the top of the adjacent bbox was above or below the cut-in value to determine whether to apply the cut-in value or not.

FIG. 6B illustrates the application of cut-in 614 following horizontal adjustment of character 616 according to the above-described algorithm. Moreover, the upper left cut-in 622 was also applied to more optimally place the subsequent character 616. In order to choose 622 over cut-in 620, the same process was used as described above. That is, the relative position of the bbox 606 was determined and in particular the bottom of the bbox 606 was located. Next, the cut-in values 620 and 622 were compared to the bottom location of bbox 606 and the cut-in value that was lower than the bottom of bbox 606, e.g., cut-in 622, was applied.

Figure 7A:
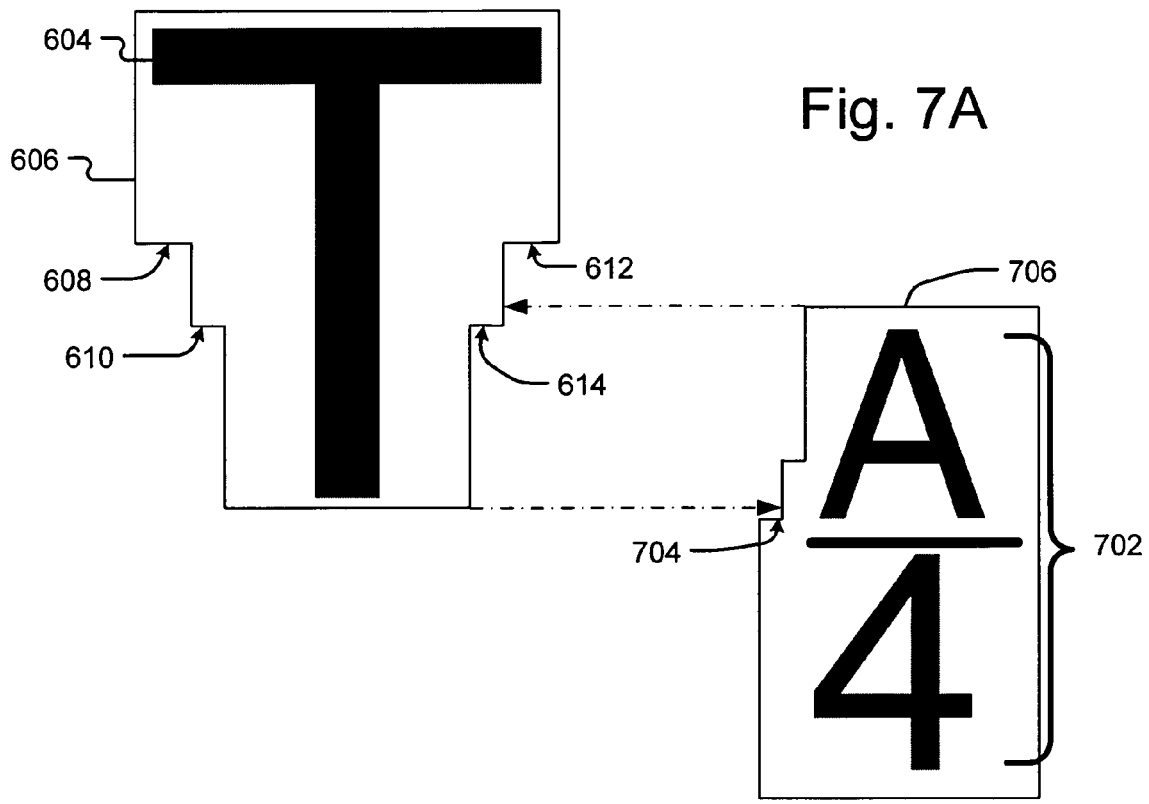
FIGS. 7A and 7B illustrate the process of determining which cut-in values to choose in horizontally placing or adjusting adjacent glyphs as in FIGS. 6A and 6B when the subsequent glyph is larger than that shown in FIGS. 6A and 6B.
Figure 7B:
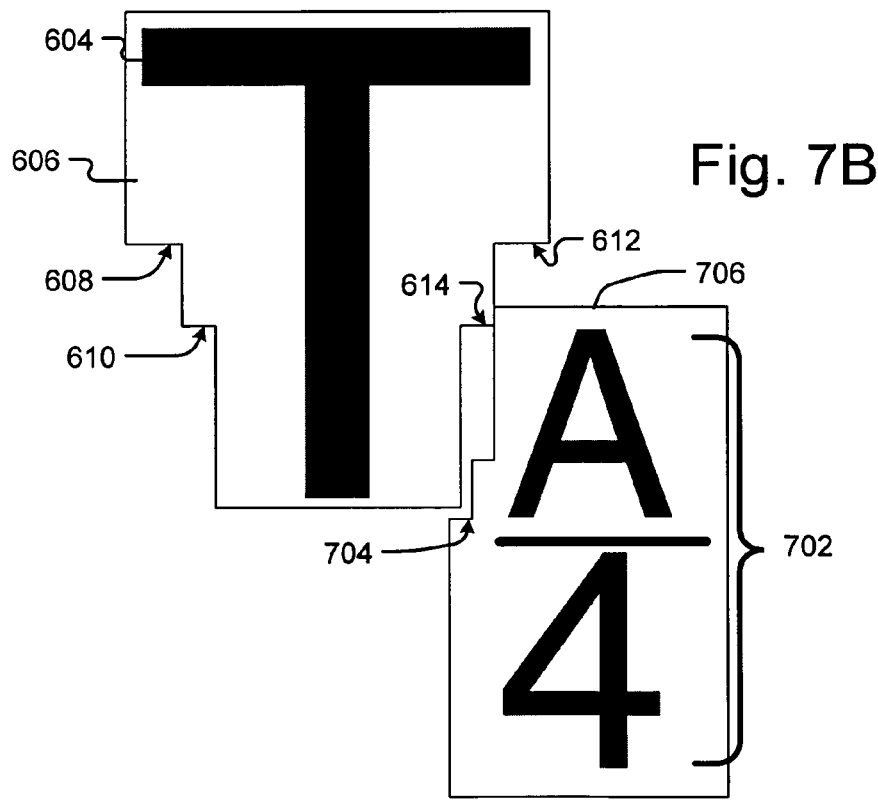

FIGS. 7A and 7B illustrate the process of determining which cut-in values to choose in horizontally placing or adjusting adjacent glyphs as in FIGS. 6A and 6B when the subsequent glyph is larger than that shown in FIGS. 6A and 6B. That is, the base character in FIG. 7A 604 is the same character 604 as shown and described above in conjunction with FIGS. 6A and 6B. Furthermore, character 604 is associated with the same bbox 606, having cut-in values 608, 610, 612 and 614. The adjacent glyph character 702, however, in this example, is larger than the character 616 shown in FIGS. 6A and 6B. As shown, the top of bbox 706 is higher than the cut-in value 614. As a result, when the relative positions of the bboxes 706 and 606 are evaluated, the cut-in value 612 is chosen and applied.

FIG. 7B illustrates the glyph 702 following horizontal adjustment in relationship to the glyph character 604. As shown, the glyph 702 is only adjusted horizontally until the bbbox 706 touches the portion of cut-in 612. Moreover, as shown in FIG. 7B, some of the cut-in value for 614 is applied to encompass part of the glyph 702. This example illustrates the inclusion of cut-in 614 as part of cut-in 612. As may be appreciated, the cut-in 704 was also applied in order to achieve the result shown in FIG. 7B. Also, as may be clear from this example, larger glyphs may get smaller cut-ins or no cut-ins at all.

Figure 8A:
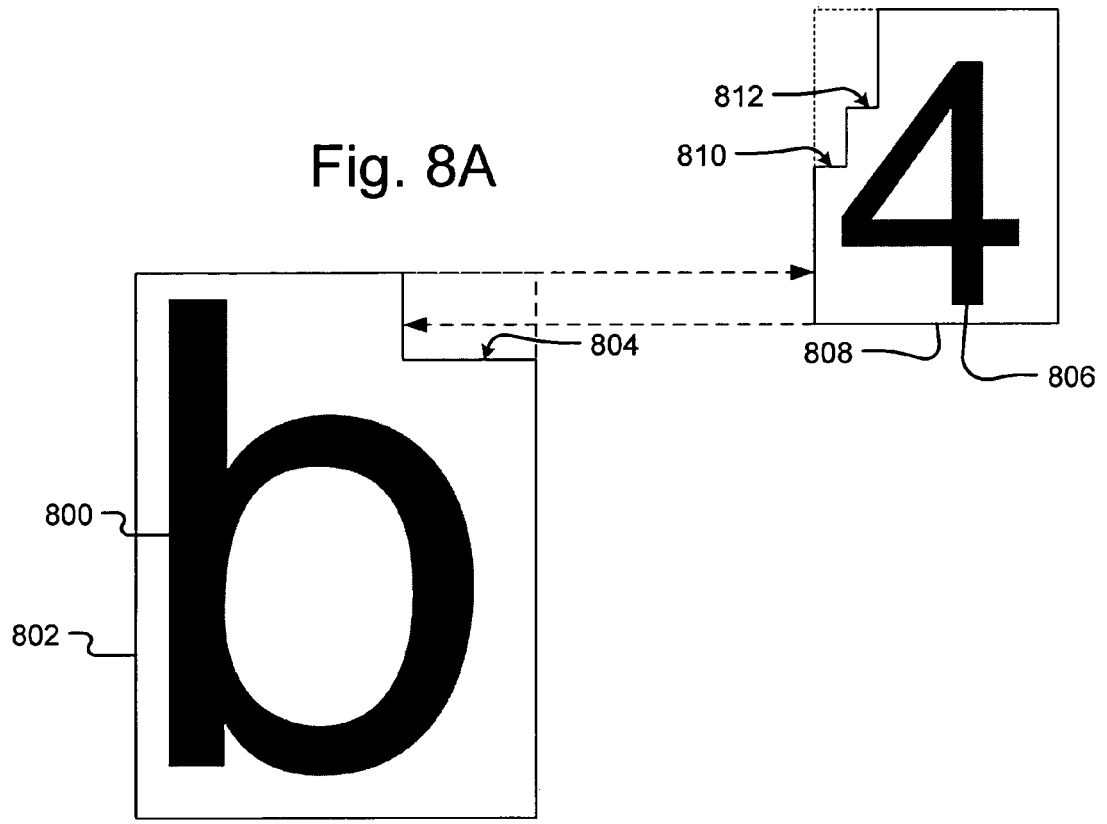
FIGS. 8A and 8B illustrate yet another example of placing adjacent glyphs in accordance with aspects of the present invention.
Figure 8B:
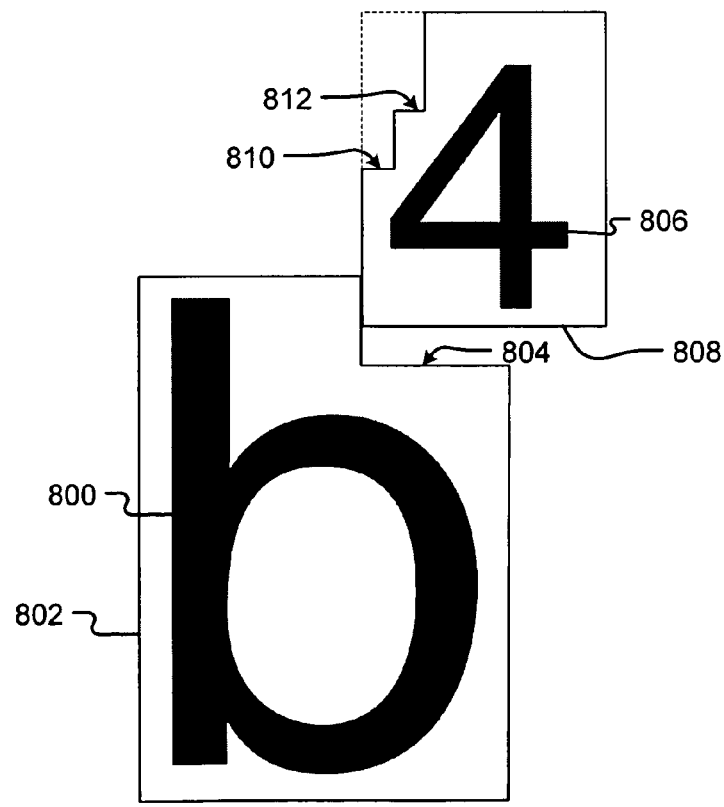

FIGS. 8A and 8B illustrate yet another example of placing adjacent glyphs in accordance with aspects of the present invention. In this example, character 800 is the base character and it is bounded by bbox 802. Also, it has a single, predetermined cut-in value 804 in its upper right-hand corner. In this case, the adjacent glyph character 806 has a bbox 808 and is vertically positioned in relationship to the character 800 in FIG. 8A. The location of the bbox 808 is identified and, in this case, the bottom of the bbox 808 is relevant since the adjacent glyph 806 is a superscript. Once the bottom of the bbox 808 is identified, it is compared to the cut-in value or location for 804. Since cut-in 804 is lower than the bottom of bbox 808, the character 806 is horizontally adjusted and placed partially within the space previously consumed by cut-in 804, as shown in FIG. 8B. As may be appreciated, cut-in values 810 and 812 associated with glyph character 806 are not used in the placement of this glyph in this example.

Figure 9:
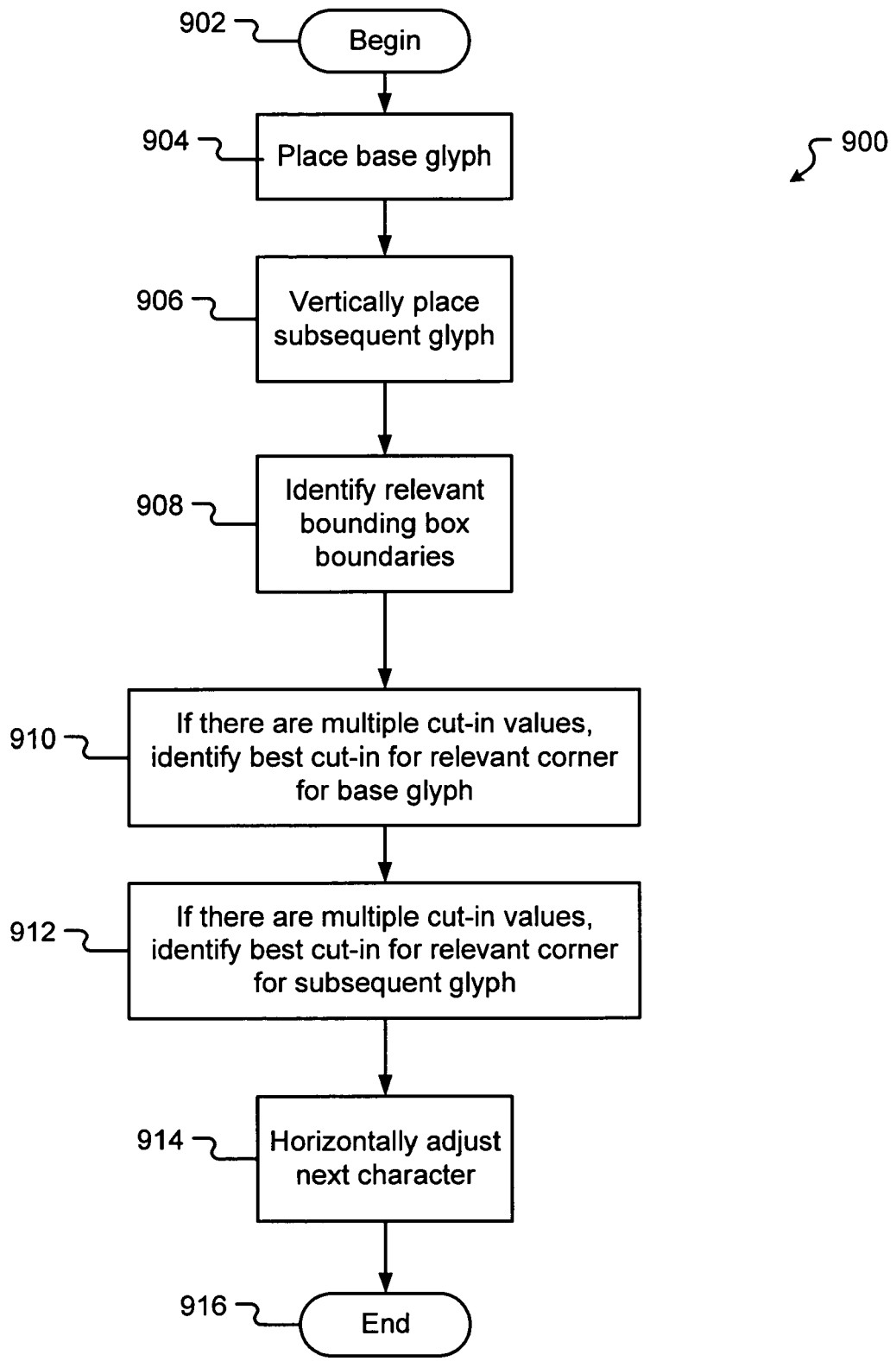
FIG. 9 is a flow diagram of the method of horizontal position adjustment used to position glyphs in accordance with the present invention.

FIG. 9 is a flow diagram of the method 900 of horizontal position adjustment used to position glyphs in accordance with the present invention. The process 900 is used, in most embodiments, to place subscript or superscript glyphs next to a base character. Importantly, the flow 900 is used to determine cut-in values so the subscript or superscript glyphs are placed closer to the actual base character. Flow 900 begins with begin operation 902 which starts the placement of characters.

Initially, place operation 904 places the base glyph and its displayable character information. The process of placing a displayable character in this manner is generally known. The rendering module is able to access glyph information in the font table and place the displayable character on the display and/or set the displayable character for printing.

Next, vertical place operation 906 vertically places the subsequent glyph. As may be appreciated placement of the subsequent glyph may include both a horizontal and a vertical placement. The present invention related to horizontal adjustment from its initial placement. Regarding initial horizontal placement, in an embodiment each glyph has an "advance width" which is usually somewhat wider than displayable information (and potentially wider than the bbox.) To initially horizontally place the subsequent glyph, the advance width is determined and then subsequent glyph is then placed accordingly. That said however, with respect to superscripts, the subsequent glyph may be shifted a little bit more to the right initially in order to compensate for italic correction since italic letters are slanted and the upper right-hand portion is moved to the right. Upon horizontally placing the subsequent glyph, the glyph may then be placed vertically.

In many embodiments, the subsequent glyph is superscript text or subscript text, such that particular vertical placement is required. The vertical placement operation 906 may involve analysis of the size of the bbox for the subsequent glyph to vertically place the same. Upon vertically placing the subsequent glyph, identify operation 908 identifies the relevant bbox boundaries. That is, if the subsequent glyph is associated with a subscript placement, then the relevant boundary is the top of the bbox for the subsequent glyph. On the other hand, if the subsequent glyph is associated with a superscript placement, then the relevant boundary is the bottom of the bbox for the subsequent glyph. Additionally, in some embodiments, the lower boundary (i.e., the bottom) of the bbox for the base glyph is relevant for subscript placement and the upper boundary (i.e., the top) of the bbox for the base glyph is relevant for superscript placements.

Next, identify operation 910 compares the relative positions of the relevant bboxes to determine if horizontal adjustment is necessary and/or available. For instance, identify operation 910 determines if there are relevant cut-in values associated with the base glyph that might apply. If the base glyph has predetermined cut-in values in the lower right hand corner and the subsequent text is subscript, then identify operation 910 would indicate that there are relevant cut-in values that might apply. Moreover, if there are relevant cut-in values, identify operation 910 also compares the values of these cut-in relation to the relevant boundaries of the subsequent bbox glyph. Accordingly, identify operation 910 can identify which is the best cut-in value to apply for the base glyph.

Similarly, identify operation 912 compares the relative positions of the relevant bboxes to determine if horizontal adjustment is necessary and/or available in relation to the subsequent glyph. For instance, identify operation 912 determines if there are relevant cut-in values associated with the subsequent glyph that might apply. If the subsequent glyph has predetermined cut-in values in the upper left hand corner and the subsequent text is subscript, then identify operation 912 would indicate that there are relevant cut-in values that might apply. Moreover, if there are relevant cut-in values, identify operation 912 also compares the values of these cut-in relation to the relevant boundaries of the base bbox glyph. Accordingly, identify operation 912 can identify which is the best cut-in value to apply for the subsequent glyph.

For operations 910 and 912, the determination of the best cut-in value is relatively straightforward. For subscript placement, once the subsequent bbox is placed vertically, the top of the subsequent bbox is located. Next, this location value is compared to the various relevant cut-in values for the base glyph. The cut-in for the bottom-right corner that is associated with the lowest height that is higher than the top of the subsequent bbox is chosen and applied. For superscript placement, once the subsequent bbox is placed vertically, the bottom of the subsequent bbox is located. Next, this location value is compared to the various relevant cut-in values for the base glyph. The cut-in for the upper-right corner that is associated with the highest height that is lower than the bottom of the subsequent bbox is chosen and applied. Similar steps are used in identifying the best cut-in value for the subsequent bbox, if there are relevant cut-in values.

Last, horizontal adjustment operation 914 adjusts the subsequent glyph image horizontally based on the applied cut-in values. Upon adjustment, the characters can then be rendered on the display and/or printed. Following adjustment operation 914, flow 900 ends with end operation 916.

Figure 10:
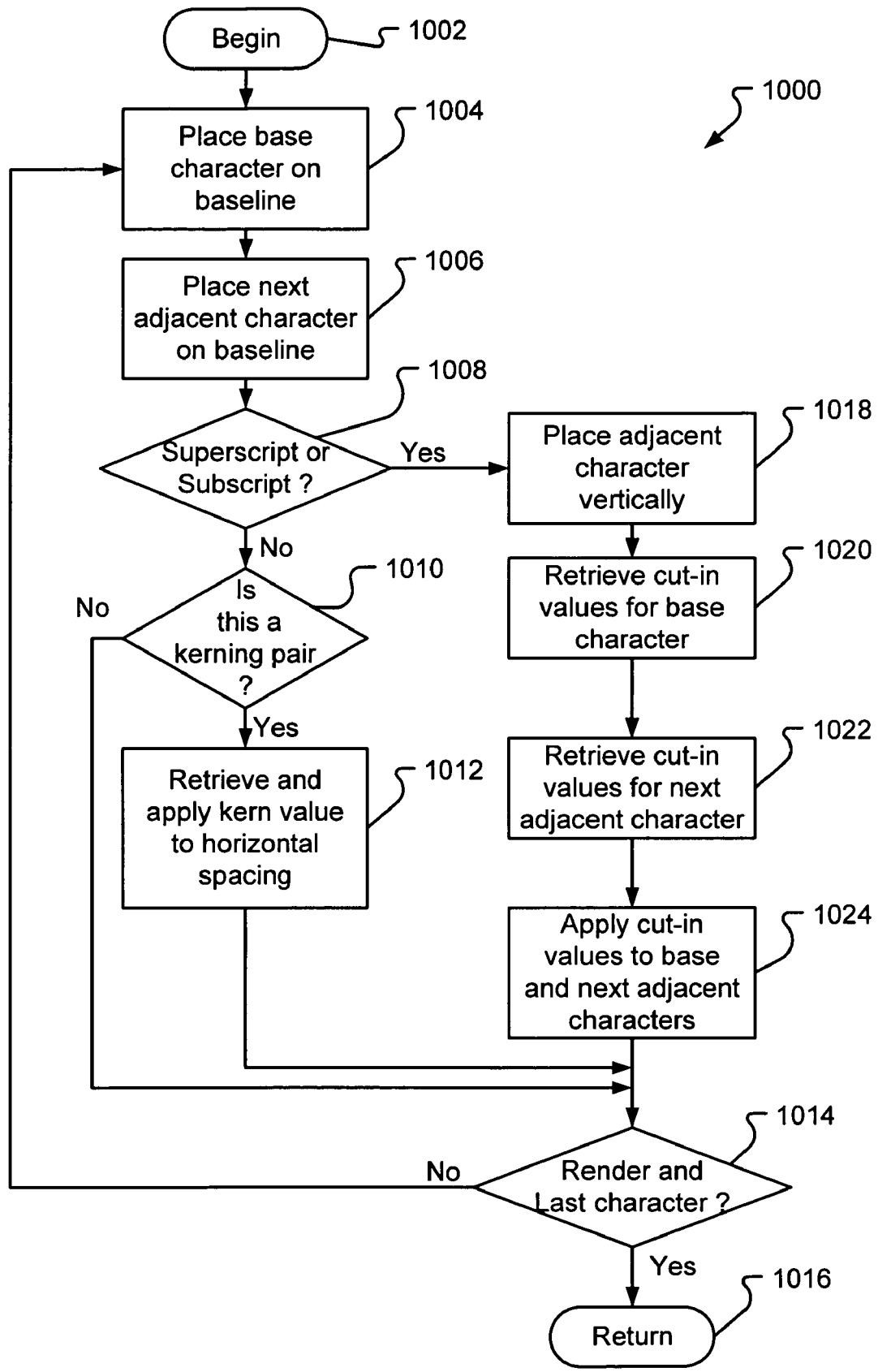
FIG. 10 is a flow diagram of the method of horizontal position adjustment used to position glyphs in accordance with other aspects of the present invention.

FIG. 10 is a flow diagram of a method 1000 of horizontal position adjustment used to position glyphs in accordance with other aspects of the present invention. The process 1000 begins in operation 1002 where a call is made to place characters in line for digital display or printing. Control then transfers to operation 1004.

Operation 1004 grabs a first character and positions it vertically. Control then transfers to operation 1006. In operation 1006, a subsequent adjacent character is retrieved and is evaluated for placement adjacent the base character.

Next, determine operation 1008 determines whether the subsequent, adjacent character is a superscript or subscript character as compared to the previously placed, base character. If the next adjacent character is not a superscript or, a subscript, then it has a normal character placement, so control transfers to query operation 1010. Evaluate operation 1010 evaluates whether the first character and the subsequent, adjacent character are a kerning pair that requires horizontal adjustment on the same baseline. If not, they are not a kerning pair, control transfers to operation 1014 which renders the first character and its next adjacent character to the target output device, such as a display or printer.

Upon rendering, determine operation 1014 determines whether the current character is the last character in the string. If not, control transfers back to operation 1004.

If, however, the evaluate operation 1010 determines the first and subsequent characters are a kerning pair, then control transfers to operation 1012, where the kern value is retrieved and spacing between the base character and next adjacent character is adjusted in accordance with the kern value. Control then transfers to operation 1014 where the first character and the subsequent, adjacent characters are rendered to the target output device, such as a display or printer control. Next, determine operation 1014 determines whether the subsequent character was the last character to be placed. If so, control transfers to end operation 1016. If not, control transfers back to operation 1004 where another character is positioned where the current subsequent character becomes the first character and another subsequent character is retrieved and evaluated for placement according to the method 1000.

However, if query operation 1008 determines that the next character is a subscript or a superscript, then control transfers to operation 1018. In operation 1018, the next character is vertically placed in accordance with the font design for a superscript or subscript. Control then transfers to operation 1020 where any cut-in values for the base character are retrieved. Control then transfers to operation 1022 where cut-in set values for the next character are also retrieved, if there are any. Control then transfers to operation 1024 where the cut-in values for the base character and next character are applied if appropriate based on the comparison of the bounding boxes for these characters.

Once the subscript or superscript has been adjusted, control then transfers to query operation 1014 where the query is made whether the next character was the last character. If so, control transfers to return operation 1016. If not, control transfers back to operation 1004 where the next character is placed in relation to the previous character.

The above-described invention provides many beneficial results in that displayed characters can be spaced in a more eye-pleasing manner. Furthermore, although the above discussion concentrates on the use of cut-in values to move or place characters closer together, it will be understood that "negative cut-in" values may actually be used to space characters farther apart. Indeed, since the cut-in values are predetermined dimensions in relation to displayed glyph information, the values could be set and used in positive (push characters closer) or negative (push characters further apart) ways. The use of cut-in values simply provide the font designer better control over such placement.

Although the invention has-been described in language specific to structural features, methodological acts, and computer readable media containing such acts, it is to be understood that the invention defined in the appended claims is not necessarily limited to the specific structure, acts or media described. Therefore, the specific structure, acts or media are disclosed herein only as preferred forms of implementing the claimed invention. They should not be interpreted as limiting the scope of the present invention. Further, many variations and changes and alternatives will readily suggest themselves to one ordinarily skilled in the art. Accordingly all such variations, changes and alternatives are also within the intended broad scope and meaning of the invention as defined by the appended claims.

What is claimed is:

1. A method of horizontally placing a subsequent glyph to a base glyph for rendering to a target device, the method comprising:

placing by a computer system the base glyph, wherein the base glyph has a bounding box;

vertically placing the subsequent glyph, wherein the subsequent glyph has a bounding box and wherein the subsequent glyph is not on the same baseline as the base glyph;

determining by a computer system whether either glyph has predetermined cut-in values, wherein the predetermined cut-in value is not limited to a fixed number of regions or a fixed position in the bounding box;

if either glyph has predetermined cut-in values, determining by a computer system a relevant predetermined cut-in value comprising evaluating at least one of: lower-right corner predetermined cut-in values associated with the base glyph, upper-right corner predetermined cut-in values associated with the base glyph, upper-left corner predetermined cut-in values associated with the subsequent glyph, and lower-left corner predetermined cut-in values associated with the subsequent glyph;

determining by a computer system a relevant horizontal boundary, wherein the relevant horizontal boundary comprises at least one of: a top boundary of the base glyph, a bottom boundary of the base glyph, a top boundary of the subsequent glyph, and a bottom boundary of the subsequent glyph; and if either glyph has a relevant predetermined cut-in value, applying by a computer system the relevant predetermined cut-in value to horizontally adjust positioning of the subsequent glyph by comparing the relevant predetermined cut-in value with the relevant horizontal boundary.

2. The method as defined in claim 1 further comprising ascertaining whether the subsequent glyph is a superscript or a subscript.

3. The method as defined in claim 1 wherein predetermined cut-in values are stored in a font table associated with the base glyph and the subsequent glyph.

4. The method as defined in claim 1 wherein the act of determining whether either glyph has a relevant predetermined cut-in value comprises:
   determining the subsequent glyph is a subscript glyph;
   finding the relevant horizontal boundary for the subsequent glyph, wherein the relevant horizontal boundary is the top of the subsequent glyph bounding box;
   evaluating one or more lower-right corner predetermined cut-in values associated with the base glyph; and
   comparing the relevant horizontal boundary to the predetermined cut-in values to determine the relevant predetermined cut-in value.

5. The method as defined in claim 4 wherein the relevant predetermined cut-in value applied is the lowest cut-in value above the top boundary of the subsequent glyph.

6. The method as defined in claim 1 wherein the act of determining whether either glyph has a relevant cut-in value comprises:
   determining the subsequent glyph is a subscript glyph;
   finding the relevant horizontal boundary for the base glyph, wherein the relevant horizontal boundary is the bottom of the base glyph bounding box;
   evaluating one or more upper-left corner predetermined cut-in values associated with the subsequent glyph; and
   comparing the relevant horizontal boundary to the predetermined cut-in values to determine the relevant predetermined cut-in value.

7. The method as defined in claim 6 wherein the relevant predetermined cut-in value applied is the highest cut-in value below the bottom boundary for the base glyph.

8. The method as defined in claim 1 wherein the act of determining whether either glyph has a relevant cut-in value comprises:
   determining the subsequent glyph is a superscript glyph;
   finding the relevant horizontal boundary for the subsequent glyph, wherein the relevant horizontal boundary is the bottom of the subsequent glyph bounding box;
   evaluating one or more upper-right corner predetermined cut-in values associated with the base glyph; and
   comparing the relevant horizontal boundary to the predetermined cut-in values to determine the relevant predetermined cut-in value.

9. The method as defined in claim 8 wherein the relevant predetermined cut-in value applied is the highest cut-in value below the bottom boundary of the subsequent glyph.

10. The method as define in claim 1 wherein the act of determining whether either glyph has a relevant cut-in value comprises:
    determining the subsequent glyph is a superscript glyph;
    finding the relevant horizontal boundary for the base glyph, wherein the relevant horizontal boundary is the top of the base glyph bounding box;
    evaluating one or more lower-left corner predetermined cut-in values associated with the subsequent glyph; and
    comparing the relevant horizontal boundary to the predetermined cut-in values to determine the relevant predetermined cut-in value.

11. The method as defined in claim 10 wherein the relevant predetermined cut-in value applied is the lowest cut-in value above the top boundary for the base glyph.

12. A computer storage medium encoding a computer program of instructions for executing a computer process for horizontally placing a subsequent glyph to a base glyph for rendering to a target device, the process comprising:
    placing the base glyph, wherein the base glyph has a bounding box;
    vertically placing the subsequent glyph in accordance with its font design, wherein the subsequent glyph has a bounding box and wherein the subsequent glyph is not on a same baseline as the base glyph;
    determining whether either glyph has a relevant predetermined cut-in value, wherein determining whether either glyph has a relevant predetermined cut-in value comprises one of:
        determining the subsequent glyph is a subscript, wherein if the subsequent glyph is a subscript, evaluating: lower-right corner predetermined cut-in values associated with the base glyph and upper-left corner predetermined cut-in values associated with the subsequent glyph; and
        determining the subsequent glyph is a superscript, wherein if the subsequent glyph is a superscript, evaluating: upper-right corner predetermined cut-in values associated with the base glyph and lower-left corner predetermined cut-in values associated with the subsequent glyph; and
    if either glyph has a relevant predetermined cut-in value, applying the relevant predetermined cut-in value to horizontally adjust positioning of the subsequent glyph, wherein applying the relevant predetermined cut-value comprises one of:
        if the subsequent glyph is a subscript, applying one of: a lowest predetermined cut-in value that is higher than the top of the subsequent glyph bounding box and a highest predetermined cut-in value that is lower than the bottom of the base glyph bounding box; and
        if the subsequent glyph is a superscript, applying one of: a highest predetermined cut-in value that is lower than the bottom of the subsequent glyph bounding box and a lowest predetermined cut-in value that is higher than the top of the base glyph bounding box.

13. A computer system, having a graphical user interface including a display device and one or more user interface selection devices, for horizontal placement of glyphs for rendering on the display device, comprising:
    font tables accessible by a horizontal placement module and a vertical placement module, the font tables having predetermined cut-in values and vertical placement information associated with one or more glyphs, wherein the predetermined cut-in value is not limited to a fixed number of regions or a fixed position in the bounding box;
    the vertical placement module, wherein the vertical placement module places a subsequent glyph vertically in accordance with its vertical placement information obtained from the font tables; and
    the horizontal placement module for adjusting horizontal positioning of sequentially adjacent glyphs, wherein the horizontal placement module determines a relevant horizontal boundary and compares the relevant horizontal boundary with the predetermined cut-in values associated with the base glyph and the subsequent glyph obtained from the font tables.

14. The system as defined in claim 13 wherein the predetermined cut-in values provide for closer placement of the subsequent glyph to the base glyph.

* * * * *